United States Patent [19]

Ichikawa et al.

[11] Patent Number: 4,868,240

[45] Date of Patent: Sep. 19, 1989

[54] POLYARYLENE THIOETHER OF HIGH CRYSTALLIZING RATE AND A PROCESS FOR PRODUCING THE SAME

[75] Inventors: Yukio Ichikawa; Takayuki Katto; Zenya Shiiki, all of Iwaki, Japan

[73] Assignee: Kureha Kagaku Kogyo Kabushiki Kaisha, Tokyo, Japan

[21] Appl. No.: 91,777

[22] Filed: Sep. 1, 1987

[30] Foreign Application Priority Data

Sep. 5, 1986 [JP] Japan .................................. 61-208900

[51] Int. Cl.$^4$ .............................................. C08G 75/14
[52] U.S. Cl. ........................................ 524/609; 525/50;
525/390; 525/420; 525/436; 525/437; 525/462;
525/471; 525/472; 525/537; 528/388; 528/486;
528/487; 528/490
[58] Field of Search ............... 528/388, 486, 487, 490;
525/537, 50, 420, 436, 437, 390, 462, 471, 472;
524/609

[56] References Cited

U.S. PATENT DOCUMENTS

| | | | |
|---|---|---|---|
| 3,919,177 | 11/1975 | Campbell | 528/388 |
| 4,251,575 | 2/1981 | Brady et al. | 528/388 |
| 4,501,713 | 2/1985 | Wright | 528/388 |
| 4,588,789 | 5/1986 | Scoggins et al. | 528/388 |
| 4,699,975 | 10/1987 | Katto et al. | 528/388 |
| 4,769,426 | 9/1988 | Iwasaki et al. | 528/388 |

FOREIGN PATENT DOCUMENTS 0166451 1/1986 European Pat. Off. .
0216116 4/1987 European Pat. Off. .

*Primary Examiner*—Harold D. Anderson
*Attorney, Agent, or Firm*—Oblon, Spivak, McClelland, Maier & Neustadt

[57] ABSTRACT

The present invention discloses a polyarylene thioether of high crystallizing rate having a necessary time for 50% crystallization of not more than 50 seconds upon crystallization of a molten polymer at 250° C. as well as a production process therefor.

15 Claims, No Drawings

POLYARYLENE THIOETHER OF HIGH CRYSTALLIZING RATE AND A PROCESS FOR PRODUCING THE SAME

BACKGROUND OF THE INVENTION

The present invention concerns a polyarylene thioether (hereinafter referred to as PATE) of high crystallizing rate and a process for producing the same.

More specifically, the present invention concerns a PATE of high crystallizing rate, having a necessary time for 50% crystallization of not more than 50 seconds from the molten polymer at 250° C., as well as a process for producing such PATE of high crystallizing rate.

PATE has been developed as a heat resistant, chemical resistant and flame resistant thermoplastic resin. Particularly, since PATE crystallizes easily, it has advantageous features in that it is excellent in the melt processability such as for injection molding and in that resultant molding products have excellent physical properties such as dimensional stability, strength, hardness and insulating performance. Taking these advantages, PATE has been employed in the industrial fields of electric, electronics, automobiles, aircrafts, precision instruments and chemicals.

However, since the crystallizing rate of PATE from the molten state is still not sufficiently high upon conducting melt processing, particularly, injection molding, a relatively long period of time is necessary till the molten product in a mold is solidified sufficiently. As a result, there has been a problem that the molding cycle can not be increased.

The present inventors have made an extensive study on a method of shortening the time required for a molten polymer to crystallize from the molten state and, as a result, have found that a novel PATE crystallizable at a high rate can be obtained by treating a PATE of an adequate molecular weight or an adequate inherent solution viscosity $\eta_{inh}$ with a solution of a non-oxidative strong acid or a strong-acid-weak-base type salt.

The present invention has been attained based on the above finding.

SUMMARY OF THE INVENTION

The object of the present invention is to provide a PATE of high crystallizing rate capable of melt processing at a high molding cycle, particularly, injection molding by shortening the time till a molten product is sufficiently solidified in a mold.

Another object of the present invention is to provide a PATE of high crystallizing rate, having a necessary time for 50% crystallization of not more than 50 seconds from the molten polymer at 250° C.

A further object of this invention is to provide a process for producing the PATE of high crystallizing rate.

DETAILED DESCRIPTION OF THE INVENTION

The PATE of high crystallizing rate according to the present invention comprises a repeating unit of

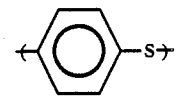

the main constituent and has the necessary time for 50% crystallization of not more than 50 seconds formed upon crystallization of a molten polymer at 250° C.

Further, the present invention also relates to a process for producing such PATE.

Specifically, the process for producing a PATE of high crystallizing rate according to the preset invention comprises bringing an alkali metal sulfide and a halo aromatic compound comprising a p-dihalo benzene as the main ingredient into a dehalogenating-sulfurizing reaction in an aprotic organic polar solvent thereby forming a PATE composed of a repeating unit of

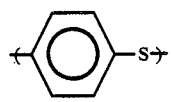

as the main constituent and having an inherent solution viscosity (measured at 206° C. with 1-chloronaphthalene solution of PATE at 0.4 g/dl in concentration) of not less than 0.05 and not more than 0.25 dl/g. The resultant polymer is separated from the reaction mixture and treated in a solution of a pH value of not more than 2, containing a non-oxidative strong acid with an ionization constant K of not less than $10^{-3}$ measured in an aqueous solution at 25° C., under the condition not to cause curing, at a temperature of 0° to 150° C. and for a time of 5 to 500 minutes, thereby obtaining a PATE having a necessary time for 50% crystallization of not more than 50 seconds formed upon crystallization of a molten polymer at 250° C.

Another method of producing a PATE of high crystallizing rate according to the present invention comprises bringing an alkali metal sulfide and a halo aromatic compound comprising a p-dihalo benzene as the main ingredient into a dehalogenating-sulfurizing reaction in an aprotic organic polar solvent thereby forming a PATE composed of a repeating unit of

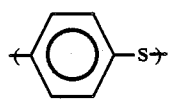

as the main constituent and having an inherent solution viscosity (measured at 206° C. with 1-chloro-naphthalene solution of PATE at 0.4 g/dl in concentration) of not less than 0.05 and not more than 0.25 dl/g. The resultant polymer is separated from the reaction mixture and treated in a solution containing 0.1 to 30% by weight of a salt prepared from a non-oxidative strong acid with an ionization constant K of not less than $10^{-3}$ and a weak base with an ionization constant K of not more than $10^{-4}$, both measured in an aqueous solution at 25° C. under the condition not causing curing and at a temperature of 0° to 150° C. and for a time of 5 to 500 minutes, thereby obtaining a PATE having a necessary time for 50% crystallization of not more than 50 seconds formed upon crystallization of a molten polymer at 250° C.

As a general property of crystalline polymer, a polymer having shorter time required for 50% crystallization from the molten polymer after the start of the crystallization at a temperature lower than its melting point (i.e., necessary time for 50% crystallization), in other words, a polymer having a sharp peak of heat radiation curve of crystallization, has a higher crystallizing rate, accordingly, requires shorter time for the molten product to be solidified in a mold during extrusion molding or the like, and, as a result, the molding cycle can be increased easily.

Accordingly, by using the PATE having a shorter time necessary for 50% crystallization according to the present invention, it is possible to remarkably improve the productivity and also significantly reduce the production cost of molded products in injection molding or the like.

Since the necessary time for 50% crystallization of conventional PATEs has been 100 seconds or longer (as will be detailed later) and more broadly speaking, from several hundreds to several thousands of seconds, the crystallizing rate acquired by the present inventors can be said extraordinarily high.

The present invention provides a PATE having the necessary time for 50% crystallization of not more than 50 seconds from a molten polymer in the course of crystallization at 250° C.

PATE OF HIGH CRYSTALLIZING RATE

Original PATE

Generally, PATE means a polymer comprising a repeating unit of

(Ar: arylene group) as the constituent, the PATE according to the present invention comprises p-phenylene group as arylene group as the main constituent. The expression "as the main constitutent" in present invention means that the repeating unit of

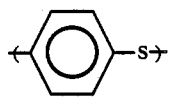

contained not less than 60 mol % and, preferable than 75 mol % of the total repeating unit of

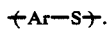

Those constituting p-phenylene group as arylene group are preferred for the PATE of high crystallizing rate. They are also preferred in view of physical properties such as heat resistance, moldability and mechanical properties.

Arylene groups other than p-phenylene group as the main constituent usable herein can include, for example, m-phenylene group

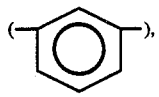

o-phenylene group

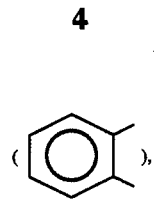

alkyl-substituted phenylene group

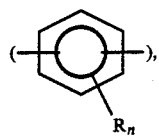

in which R represents alkyl group (preferably lower alkyl group) and n is an integer of 1 to 4, p, p'-diphenylenesulfone group

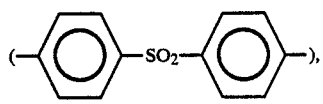

p,p'-biphenylene group

p,p'-diphenylene ether group

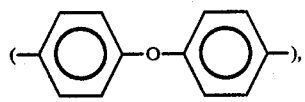

p,p'-diphenylene carbonyl group

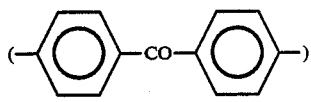

and naphthalene group

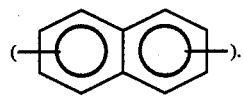

From the viewpoint of processability, those copolymers containing different types of repeating units are generally better than those homopolymers containing only the repeating unit of

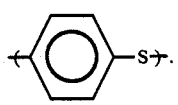

As the copolymer, those comprising

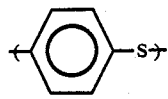

and

are preferred and, particularly, those containing the respective repeating units in the block form are more preferable to those containing such units in the random form (refer to EP-A 166,451), because use of the block copolymer is excellent over use of the random copolymer in physical properties (heat resistance, mechanical properties, etc.), although they are substantially equal with respect to processability. 5 to 40 mol % of the repeating unit of

in the block copolymer (i.e., 95 to 60 mol % of the repeating unit of

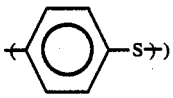

is preferable and, particularly, 10 to 25 mol % is more preferable.

As the PATE according to the present invention, those of substantially linear structure are preferred in respect to crystallization properties and physical properties. However, crosslinked product obtained by using a small amount of a crosslinking agent (for example, 1,2,4-trichlorobenzene) upon polymerization, within a range not impairing the crystallization properties and physical properties, may also be used. Uncured PATE is preferred as the original polymer for the present invention. Judging from the fact that (a) cured PATE is difficult to form a PATE, of which necessary time for 50% crystallization is not more than 50 seconds and (b) as it contains many branched and cross-linked structures, its molded product has insufficient mechanical strength, is discolored severely and is unstable upon melt processing, cured PATE is not preferable in respect to physical properties and processability.

As the original PATE of the present invention, those having melting point higher than 250° C. are preferred. If the melting point is lower than 250° C., the major feature as a heat resistant polymer is impaired.

In the case of producing a PATE of high crystallizing rate by processing such original PATE, the molecular weight of the original PATE is an important factor (will be explained later in detail).

The PATE preferable for the present invention as described above can be produced generally by bringing an alkali metal sulfide (for example, sodium sulfide) and a halo aromatic compound containing p-dihalo benzene as the main ingredient into a dehalogenating-sulfurizing reaction in an aprotic organic polar solvent (for example, N-methyl pyrrolidone). Practically, it can be produced with an economical advantage, for example, by the method described in U.S. Pat. No. 4,645,826 filed by the present inventors. In addition, a method described in U.S. Pat. No. 3,919,177 in which a polymerization aid such as a carboxylic acid salt is added in a large amount to obtain a high molecular weight PATE can also be used. However, the latter method is disadvantageous from an economical point of view.

Crystallization Property

The feature of the PATE of high crystallizing rate according to the present invention lies in that the necessary time for 50% crystallization of a molten polymer in the course of crystallization at 250° C. is as short as not more than 50 seconds and particularly, not more than 40 seconds. As has been described above, "necessary time for 50% crystallization" means the time required till the crystallized amount of a molten polymer reaches 50%. Since necessary time for 50% crystallization in conventional PATEs is from several hundreds to several thousands of seconds, the crystallizing rate of PATE according to the present invention is outstandingly high and, accordingly, the molding cycle can significantly be improved by the PATE of the present invention.

Production of PATE of High Crystallizing Rate

Production of PATE of high crystallizing rate according to the present invention can include, for example, the following process, namely, a process of selecting a PATE having an adequate molecular weight among the PATEs with the structure appropriate to the present invention and processing it in a solution of a non-oxidative strong acid or of a strong-acid-weak-base type salt, although the method is not limited thereto.

Molecular Weight of Original PATE Since the molecular weight of a PATE gives a significant effect on its necessary time for 50% crystallization, this is an extremely important factor.

A preferred range for the molecular weight of PATE with high crystallizing rate according to the present invention, when expressed by an inherent solution viscosity $\eta_{inh}$ (measured at 206° C. with a 1-chloronaphthalene solution of PATE at 0.4 g/dl in concentration), is within a range not less than 0.05 and not more than 0.25 dl/g and, more preferably, in a range of 0.10 to 0.20 dl/g.

If the $\eta_{inh}$ is in excess of 0.25 dl/g, it is difficult to form a PATE having a necessary time for 50% (crystallization of not more than 50 seconds. While on the other hand, the $\eta_{inh}$ of less than 0.05 dl/g is not preferred from the fabrication and physical properties point of view, for example the melt processing is difficult due to the low melt viscosity and mechanical properties of resultant molded products are poor.

Treatment with Acidic Solution

The effective method to obtain PATE with necessary time for 50% crystallization of not more than 50 seconds is a process of the present invention, comprising (1) forming a PATE having the properties as described above through a polymerization reaction in a solvent, (2) separating the PATE formed from the reaction mixture and (3) treating in a solution of a non-oxidative strong acid or of a non-oxidative strong-acid-weak-base type salt. Namely, a polyarylene thioether (PATE) is formed through a dehalogenating-sulfurizing reaction between an alkali metal sulfide and a dihalo aromatic compound in an aprotic organic polar solvent and the solid polymer separated from the polymerization reaction mixture is treated as above. The solid polymer may be a wet or dried solid polymer separated from the liquid mixture by means of filtration, sieving, etc. or it may be a wet or dried polymer obtained after washing with methanol, water, etc. When the particle size is large, the polymer is preferably pulverized in a mill or the like before the treatment.

A treatment in a solution of a strong acid or in a solution of a strong-acid-weak-base type salt is applied to such polymer. Polymer content in the solution of the treating agent is preferably 2 to 70% by weight.

(a) Treatment with Strong Acid

The polymer is added to a strong acid solution and treated under the condition of pH value of not more than 2 and, preferably, not more than 1.5. If the pH value of the treating solution is not lower than 2, reaction of terminal residues is undesirably insufficient. The temperature is 0° to 150° C, preferably, 20° to 100° C. and, more preferably, 20° to 80° C. Temperature lower than 0° C. is not preferable since penetration of the strong acid solution to the core part of solid polymer (usually granular or powdery) is difficult. While on the other hand, temperature higher than 150° C. is not preferable because the polymer may probably be cured. The treating time is 5 to 500 minutes, preferably, 10 to 300 minutes. The reaction is insufficient if the time is shorter than 5 minutes, whereas no substantial increase of the efficiency can be obtained if it exceeds 500 minutes and is uneconomical.

As the acid for the strong acid solution, a non-oxidative acid with the ionization constant K of not less than $10^{-3}$, measured in an aqueous solution at 25° C., is preferred. An oxidizing acid is not desirable because it may probably cause curing. Strong acid such as hydrochloric acid, diluted sulfuric acid, phosphoric acid, formic acid and halogenated acetic acid is preferred.

As a solvent for the strong acid solution, water or a mixture of water and alcohol, ketone or ether, mainly composed of water, is used. It is preferable that alcohol, ketone or ether has a sufficient miscibility with water and a sufficient solubility of acid to form an aqueous solution as a solvent. The solubility of thee organic solvents and the solubility of the strong acids thereto are well-known in handbooks or like. Particularly, from the standpoint of its chemical stability and economical advantage, it is preferable to use hydrochloric acid, diluted sulfuric acid or phosphoric acid as the acid, and water, an aqueous solution of alcohol (particularly, lower alcohol) or an aqueous solution of ketone (particularly, di-lower alkyl ketone) as the solvent.

After treating with the strong acid solution, it is preferable, for obtaining thermally and chemically stable polymer, to wash out sufficiently the strong acid solution remaining in the solid polymer, or to neutralize the remaining acid with a weak base such as ammonia and then wash with water. Particularly, the latter method of neutralizing with a weak base is preferred because a polymer of excellent in color can be obtained easily. The use of weak base, not strong base, is preferable, because if the neutralization is conducted with a strong base, the rate of crystallization may become similar rate as that before the treatment with the strong acid solution.

(b) Treatment with Strong-Acid-Weak-Base Type Salt

As the strong acid in the strong-acid-weak-base type salt, the non-oxidative strong acid exemplified above, for example, hydrochloric acid, diluted sulfuric acid, maleic acid, formic acid, halogenated acetic acid, etc. is preferable and, as the weak bases, those having ionization constant K, measured in an aqueous solution at 25° C., of not more than $10^{-1}$ are preferred. Particularly, ammonia, pyridine, etc. are used preferably. Among possible combinations, $NH_4Cl$, $(NH_4)_2SO_4$ and $(NH_4)_3PO_4$ are preferable due to their excellent effect.

As the solvent for these salts, those mentioned above for the strong acid solution may be used. Water and/or alcohol (particularly, lower alcohol) is particularly preferable in view of its high solubility of the salt.

The concentration of the salt in the solution for the treatment is within a range 0.1 to 30% by weight, preferably, 0.2 to 20% by weight. The effect is insufficient if the concentration is less than 0.1% by weight, whereas no substantial increase of effect can be obtained when it exceeds 30% by weight and so is uneconomical.

The temperature for the treatment is within a range of 0° to 150° C., preferably, 20° to 100° C. and, particularly preferable, 20° to 80° C. The time for the treatment is, preferably, 5 to 500 minutes and 10 to 300 minutes is particularly preferable. The reason for defining the temperature and the time for the treatment within the above ranges is same as described above for the strong acid treatment.

After treating with the salt solution, the treated polymer can be cleaned by simple water washing and be stable sufficiently. In the case of strong acid treatment (a) above, a treatment device made of expensive special corrosion resistant material (nickel, nickel alloy, etc.) has to be used since ordinary corrosion resistant material (stainless steels, etc.) is easily corroded. However, in the case of salt treatment (b), a treatment device made of usual corrosion resistant material (stainless steels, etc.) can be used and, accordingly, the method (b) is overwhelmingly advantageous and preferable in view of the production procedures and the economical point.

Composition

The PATE with high crystallizing rate according to the present invention can be applied as it is to each of the melt processing methods, but it can be used as a composition with one or more materials selected from (i) fibrous fillers such as glass fibers, carbonaceous fibers, silica fibers, alumina fibers, silicon carbide fibers, zirconia fibers, calcium titanate fibers, wollastonite, calcium sulfate fibers and aramide fibers, (ii) inorganic powdery fillers such as talc, mica, clay, kaolin, calcium carbonate, magnesium carbonate, calcium silicate, magnesium silicate, silica, alumina, titanium white, carbon black, calcium sulfate, iron oxide, zinc oxide and copper oxide, (iii) synthetic resins such as polyolefin, polyester, polyamide, polyimide, polyether imide, polycarbonate, polyphenylene ether, polysulfone, polyether sulfone, polyether ether ketone, polyether ketone, polyarylene, polyacetal, polyvinylidene fluoride, polyethylene tetrafluoride, polystyrene, ABS resin, epoxy resin, urethane resin, silicone resin and phenol resin, or (iv) elastomers such as polyolefin rubber, fluorine rubber, silicone rubber, hydrogenated SBR, butyl rubber, polyester rubber and polyamide rubber.

However, to take advantage of the feature of the PATE with high crystallizing rate of the present invention, it is preferred that the PATE is contained in the composition at least not less than 20% by weight, more preferable, not less than 30% by weight and, particularly preferable, not less than 50% by weight.

Since the PATE of high crystallizing rate according to the present invention or the composition thereof has a remarkably high crystallizing rate upon melt molding, it is particularly suitable for injection molding, etc. Accordingly, the PATE according to the present invention or the composition thereof is particularly suitable for the application use, for example, packaging materials (for use in IC, capacitors, transistors, etc.) and precise components.

Furthermore, the PATE according to the present invention can be added in an amount of not less than 5% by weight, as a sort of crystallization accelerator to conventional PATEs of usual crystallizing rate.

EXPERIMENTAL EXAMPLE

Synthetic Experimental Example 1

Into a titanium-lined autoclave, 372 kg of hydrous sodium sulfide 1(solid content, 46.10%) and 1020 kg of N-methylpyrrolidone (NMP) were charged and the temperature was increased to about 203° C. to distill out 144 kg of water. Then, 4 kg of water and 50 kg of NMP were supplied additionally (total water/NPM=3.0 mol/kg). Then, 353 kg of p-dichlorobenzene was charged (total arylene group/NMP=2.25 mol/kg) into the autoclave.

After reacting at 210° C. for 6 hours and at 220° C. for 2 hours, 77 kg of water was supplied additionally (total water/NMP=7.0 mol/kg). Then, they were polymerized at 258° C. for 1.5 hours.

The reaction mixture was sieved through a 0.1 mm mesh screen to separate only the granular polymer, which was washed with acetone. A portion of the wet polymer was washed with water and dried under a reduced pressure to obtain a polymer 1A.

Another portion of the wet polymer was immersed in an aqueous 2%-NH$_4$Cl solution and treated at 40° C. for 30 minutes, washed with water and dried under a reduced pressure to obtain a polymer 1B.

A further portion of the wet polymer was treated by being immersed in an aqueous 5%-NH$_4$Cl solution at 40° C. for 30 minutes, washed with water and dried under a reduced pressure to obtain a polymer 1C.

Synthetic Experimental Example 2:

Into a titanium-lined autoclave, 372 kg of hydrous sodium sulfide (solid content, 46.6%) and 826.5 kg of NMP were charged and the temperature was increased to about 203° C. to distill out 144 kg of water. Then, 4 kg of water and The reaction mixture was sieved through a 0.1 mm mesh screen to separate only the granular polymer, which was washed with acetone.

A portion of the wet polymer was washed with water and dried under a reduced pressure to obtain a polymer 2A.

Another portion of the wet polymer was immersed in an aqueous 2%-NH Cl solution and treated at 40° C. for 30 minutes, washed with water and dried under a reduced pressure to obtain a polymer 2B.

Synthetic Experimental Example 3

Into a titanium-lined autoclave, 372 kg of hydrous sodium sulfide (solid content, 46.6%) and 827 kg of NMP were charged and the temperature was increased to about 203° C. to distill out 145 kg of water. Then, 3 kg of water and 250 kg of NMP were supplied additionally (total water/NMP=2.01 mol/kg).

After reacting at 210° C. for 10 hours, 136 kg of water was supplied additionally (total water/NMP=10.0 mol/kg). Then, they were polymerized at 260° C. for 2 hours.

The reaction mixture was sieved through a 0.1 mm mesh screen to separate only the granular polymer, which was washed with acetone.

A portion of the wet polymer was washed with water and dried under a reduced pressure to obtain a polymer 3A.

Another portion of the wet polymer was immersed in an aqueous 5%-NH$_4$Cl solution and treated at 40° C. for 30 minutes, washed with water and then dried under a reduced pressure to obtain a polymer 3C.

Synthetic Experimental Example 4

Into a titanium-lined autoclave, 423 kg of hydrous sodium sulfide (solid content, 46.09%) and 930 kg of NMP were charged and the temperature was increased to about 203° C. to distill out 170 kg of water. Then, 4 kg of water and 43 kg of NMP were supplied additionally (total water/MMP=3.5 mol/kg). Then, 365 kg of p-dichlorobenzene was charged (total arylene group/NMP=2.55 mol/kg). After reacting at 220° C. for 5 hours, 136 kg of water as supplied additionally (total water/NMP =11.3 mol/kg). Then, they were polymerized at 260° C. for 4 hours.

The reaction mixture was sieved through a 0.1 mm mesh screen to separate only the granular polymer, which was washed with acetone.

A portion of the wet polymer was treated by being immersed in an aqueous 2%-NH$_4$Cl solution at 40° C. for 30 minutes, washed with water and dried under a reduced pressure to obtain a polymer 4B.

Another portion of the wet polymer was immersed in an aqueous hydrochloric acid solution of pH=1 and treated at 40° C. for 30 minutes, washed with an aqueous diluted ammonia, washed with water and then dried under a reduced pressure to obtain a polymer 4C.

Example 1

Inherent viscosity $\eta_{inh}$ was determined for each of the synthesized polymers from the solution viscosity in a 1-chloronaphthalene solution of PATE at 0.4 g/dl in concentration at 206° C.

The necessary time for 50% crystallization was determined by a conventional method using DSC (for example, as described in "High Polymer Chemistry"25, 155 (1968)). The measuring conditions are as follows. About 5 mg of each sample was melted at 340° C. for one minute and rapidly cooled to 250° C. at a rate of 200° C./minute and kept at 250° C. to obtain an isothermal crystallization curve. Based on the obtained isothermal crystallization curve, a time required for the crystallization of one-half of the entire crystallizable ingredient was determined.

As examples of commercially available conventional PATEs, "RYTON-P4 ®" and "RYTON-V1 ®" (made by Phillips Petroleum Co.) were used for comparison.

The results are collectively shown in Table 1.

TABLE 1

| Polymer Code | $\eta_{inh}$ (dl/g) | Time for 50% Crystallization (second) | Remarks |
|---|---|---|---|
| 1A | 0.13 | 380 | Comparative Example |
| 1B | 0.13 | 25 | Example |
| 1C | 0.12 | 20 | Example |
| 2A | 0.16 | 920 | Comparative Example |
| 2B | 0.16 | 30 | Example |
| 3A | 0.18 | 1340 | Comparative Example |
| 3C | 0.17 | 35 | Example |
| 4B | 0.26 | 150 | Comparative Example |
| 4C | 0.26 | 110 | Comparative Example |
| P4 | 0.28 | 420 | Comparative Example |
| V1 | 0.15 | 1110 | Comparative Example |

Example 2

Pellets were prepared by uniformly blending 81 parts by weight of commercially available PATE, RYTON-P4®, and 19 parts by weight of the polymer 1B obtained in Synthetic Experimental Example 1 in a Henshel mixer, melt extruding the blend into a strand-like shaped by a parallel twin-screw extruder and rapidly cooling and cutting the extrudate.

Necessary time for 50% crystallization in second was measured for the obtained pellets by the same method described in Example 1. The necessary time for 50% crystallization of the product in this Example was 230 seconds and it can be seen that the time is significantly reduced as compared with the time of 420 seconds for RYTON-P4® alone (refer to P4 in Table 1).

What is claimed is:

1. A polyarylene thioether comprising a repeating unit of

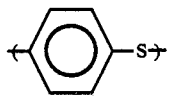

as the main constituent and having a necessary time for 50% crystallization of not more than 50 seconds upon crystallization of a molten polymer at 250° C., obtained by treating a polyarylene thioether, having an inherent solution viscosity measured at 206° C. with a 1-chloronaphthalene solution having a concentration of the polymer of 0.4 g/dl, of not less than 0.05 and not more than 0.25 dl/g, with an aqueous solution of a non-oxidative strong acid or of a non-oxidative strong-acid-weak-base salt.

2. The polyarylene thioether according to claim 1, wherein said repeating unit of

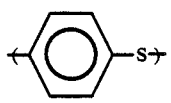

comprises not less than 60 mol %.

3. The polyarylene thioether according to claim 1, which comprises a copolymer containing 60 to 95 mol % of said repeating unit of

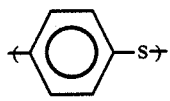

as the main constituent and 40 to 5 mol % of the repeating unit of

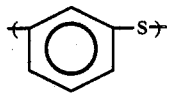

as the minor constituent.

4. The polyarylene thioether according to claim 3, wherein said copolymer contains respective repeating unit of

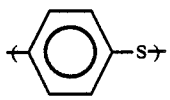

and

each in a block form.

5. A polyarylene thioether according to claim 1, wherein said non-oxidative strong-acid-weak-base salt is ammonium chloride.

6. A process for producing polyarylene thioether with high crystallizing rate, which comprises reacting an alkali metal sulfide and a halo aromatic compound comprising a p-dihalo benzene as the main ingredient in an aprotic organic polar solvent, thereby forming a polyarylene thioether comprising

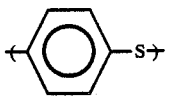

as the main constituent and having an inherent solution viscosity measured at 260° C. with a 1-chloronaphthalene solution having a concentration of the polymer of 0.4 g/dl, of not less than 0.05 and not more than 0.25 dl/g, separating the resulting polymer from the reaction mixture, and treating with a solution with a pH value of not more than 2 containing a non-oxidative strong acid with an ionization constant K measured in an aqueous solution at 25° C., of not less than $10^{-3}$ under a condition not causing curing and at a temperature of 0 to 150° C. and for a time of 5 to 500 minutes, thereby obtaining a polyarylene thioether with a necessary time of 50% crystallization of not more than 50 seconds when formed upon crystallization at 250° C. from the molten polymer.

7. The process according to claim 6, wherein said non-oxidative strong acid is at least one of the acids selected from the group consisting of hydrochloric acid, diluted sulfuric acid, phosphoric acid, formic acid and halogenated acetic acid.

8. A process for producing polyarylene thioether with high crystallizing rate, which comprises reacting an alkali metal sulfide and a halo aromatic compound comprising a p-dihalo benzene as the main ingredient in an aprotic solvent, thereby forming a polyarylene thioether comprising

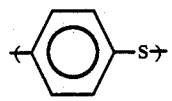

as the main constituent and having an inherent solution viscosity, measured at 206° C. with a 1-chloronaphthalene solution having a concentration of the polymer of 0.4 g/dl, of not less than 0.05 and not more than 0.25 dl/g, separating the resulting polymer from the reaction mixture, and treating with a solution containing 0.1 to 30% by weight of a salt composed of a non-oxidative strong acid with an ionization constant K of not less than $10^{-3}$ and a weak base with an ionization constant K of not more than $10^{-4}$, both measured in an aqueous solution of 25° C., under a condition not causing curing and at a temperature of 0° to 150° C. and for a time of 5 to 500 minutes, thereby obtaining a polyarylene thioether with a necessary time for 50% crystallization of not more than 50 seconds when formed upon crystallization from the molten polymer at 250° C.

9. The process according to claim 8, wherein said strong acid is at least one of the acids selected from the group consisting of hydrochloric acid, diluted sulfuric acid, phosphoric acid, formic acid and halogenated acetic acid; and said weak base is at least one of the bases selected from the group consisting of ammonia and pyridine.

10. A process for producing a polyarylene thioether having a crystallizing rate higher than that of commercially available polyarylene thioether, wherein the polyarylene thioether according to claim 1 is mixed in an amount of not less than 5% by weight into said commercially available polyarylene thioether.

11. A polyarylene thioether composition containing not less than 20% by weight of the polyarylene thioether according to claim 1 and comprising one or more of fibrous fillers, inorganic powdery fillers, synthetic resins or elastomers.

12. The polyarylene thioether composition according to claim 11, wherein said fibrous fillers comprise glass fibers, carbonaceous fibers, silica fibers, alumina fibers, silicon carbide fibers, zirconia fibers, calcium titanate fibers, wollastonite, calcium sulfate fibers, aramide fibers or the mixture thereof.

13. The polyarylene thioether composition according to claim 11, wherein said inorganic powdery fillers comprise talc, mica, clay, kaolin, calcium carbonate, magnesium carbonate, calcium silicate, magnesium silicate, silica, alumina, titanium white, carbon black, calcium sulfate, iron oxide, zinc oxide, copper oxide or the mixture thereof.

14. The polyarylene thioether composition according to claim 9, wherein said synthetic resins comprise polyolefin, polyester, polyamide, polyimide, polyether imide, polycarbonate, polyphenylene ether, polysulfone, polyether sulfone, polyether ether ketone, polyether ketone, polyarylene, polyacetal, polyvinylidene fluoride, polyethylene tetrafluoride, polystyrene, acrylonitrile-butadiene-styrene resin epoxy resin, urethane resin, silicone resin, phenol resin or the mixture thereof.

15. The polyarylene thioether composition according to claim 11, wherein said elastomers comprise polyolefin rubber, fluorine rubber, silicone rubber, hydrogenated styrene-bytadiene-rubber, butyl rubber, polyester rubber, polyamide rubber or the mixture thereof.

* * * * *